United States Patent [19]

Loree

[11] Patent Number: 5,674,816

[45] Date of Patent: Oct. 7, 1997

[54] OLEFIN BASED FRAC FLUID

[76] Inventor: Dwight N. Loree, 758 Woodpark Rd. SW., Calgary, Alberta, Canada, T2X 2S4

[21] Appl. No.: 457,872

[22] Filed: Jun. 1, 1995

[30] Foreign Application Priority Data

Jan. 25, 1995 [CA] Canada .................... 2141112

[51] Int. Cl.$^6$ ............................ E21B 43/25; E21B 43/26
[52] U.S. Cl. ........................ 507/118; 507/231; 166/308
[58] Field of Search .................................. 507/118, 231

[56] References Cited

U.S. PATENT DOCUMENTS

| 2,217,926 | 10/1940 | Van Campen ........................ 255/1 |
| 2,297,660 | 9/1942 | Mazee ........................ 252/8.5 |
| 2,805,722 | 9/1957 | Morgan et al. ........................ 166/35 |
| 3,368,627 | 2/1968 | Hurst et al. . |
| 3,601,198 | 8/1971 | Ahearn et al. . |
| 3,664,422 | 5/1972 | Bullen . |
| 3,835,927 | 9/1974 | OudeAlink et al. ........................ 166/304 |
| 3,842,910 | 10/1974 | Zingg et al. . |
| 3,913,672 | 10/1975 | Allen et al. . |
| 3,974,116 | 8/1976 | Lissant ........................ 260/29.2 |
| 4,519,455 | 5/1985 | Holtmyer et al. . |
| 4,617,993 | 10/1986 | Brown . |
| 4,701,270 | 10/1987 | Bullen et al. . |
| 4,775,489 | 10/1988 | Watkins et al. ........................ 252/8.552 |
| 4,825,952 | 5/1989 | Mzik . |
| 5,241,085 | 8/1993 | Senaratne et al. ........................ 549/396 |
| 5,322,633 | 6/1994 | Senaratne et al. ........................ 252/56 |
| 5,407,009 | 4/1995 | Butler et al. ........................ 166/266 |
| 5,499,679 | 3/1996 | Loree . |
| 5,515,923 | 5/1996 | Loree . |

FOREIGN PATENT DOCUMENTS

| 40138/93 | 6/1993 | Australia . |
| 1 134 258 | 10/1982 | Canada . |
| 1 268 325 | 5/1990 | Canada . |

OTHER PUBLICATIONS

Hassen et al, "Improving oilwell stimulations with compatible oils", Journal of Canadian Petroleum Technology, At least as early as 1990.

McGraw-Hill Dictionary of Scientific and Technical Terms, USA, 4th Edition, 1989, p. 1313.

McGraw-Hill Encyclopaedia of Engineering, U.S.A. 2nd Edition, 1993, pp. 27-29, 32, 40-42, 133, 377, 487, 491, 493-495, 498-500, 839-840, 856-859.

Black Harold N. and Robert W. Langsford. "Energized Fracturing With 50% $CO_2$ for Improved Hydrocarbon Recovery", Jan. 1982, SPE, pp. 76-77.

Craft, J.R., S.P. Waddell and D.G. McFatridge. "$CO_2$–Foam Fracturing With Methanol Successfully Stimulates Canyon Gas Sand", May 1992, pp. 8-10.

Deysarker, A.K., J.C. Dawson and A.R. Acharya. "Experience With $CO_2$–Laden Fracturing Fluid for Stimulating Water-Sensitive Formations", Society of Petroleum Engineers, Inc., pubs., 1987, 2 pp.

"Dresser Titan T-300", $CO_2$ Engineering, No Date, pp. 1-34, Texas.

Fairless, C.M. and W. Joseph. "Effective Well Stimulations With Gelled Methanol/Carbon Dioxide Fracturing Fluids", Society of Petroleum Engineers, 1986, pp. 62-63.

Gruber, Norman G. and Hal A. Anderson. "Carbonated Hydrocarbons For Improved Gas Well Fracturing Results", 1994, pp. 1-15, Core Laboratories Canada, Ltd.

Hassen, B.R., K.E. Porter and L.L. McCorriston. "Improving Oilwell Stimulations With Compatible Oils", Well Completions and Operations, Journal of Canadian Petroleum Technology, 1984, pp. 1-7.

Harris, Phillip C. "Dynamic Fluid-Loss Characteristics of $CO_2$–Foam Fracturing Fluids", May 1987, SPE, pp. 88-89.

Harris, P.C., R.J. Haynes and J.P. Egger. "The Use of $CO_2$–Based Fracturing Fluids in the Red Fork Formation in the Anadarko Basin, Oklahoma", Jun. 1984, SPE, pp. 10-11.

Holm, L.W. and V.A. Josendal. "Mechanisms of Oil Displacement by Carbon Dioxide", Dec. 1974, pp. 1426-1427, JPT.

Holm, LeRoy W. and Virgil A. Josendal. "Effect of Oil Composition on Miscible-Type Displacement by Carbon Dioxide", Feb. 1982, SPEJ, pp. 86-87.

Keelan, D.K. and E.H. Koepf. "The Role of Cores and Core Analysis in Evaluation of Formation Damage", Journal of Petroleum Technology, pp. 482-490, 1976.

King, S.R. "Liquid $CO_2$ for the Stimulation of Low-Permeability Reservoirs", Society of Petroleum Engineers AIME, pubs., 1983, Theory, pp. 144-145.

Lancaster, Greg, and Mary Lou Sinal. "Liquid $CO_2$ Fracturing Advantages and Limitations", a paper (No. 86-37-69) presented at the 37th Annual Technical Meeting of the Petroleum Society of CIM/Calgary, Jun. 8-11, 1986, pp. 425-435.

Lillies, Allen T. and Steven R. King. "Sand Fracturing With Liquid Carbon Dioxide", Society of Petroleum Engineers of AIME, 1982, pp. 13-14.

Orr, Jr., F.M. and M.K. Silva. "Effect of Oil Composition on Minium Miscibility Pressure–Part 2: Correlation", Nov. 1987, SPERE, pp. 478-479.

Reidenbach, V.G., P.C. Harris, Y.N. Lee, and D.L. Lord. "Rheological Study of Foam Fracturing Fluids Using Nitrogen and Carbon Dioxide", Jan. 1986, SPERE, pp. 30-31.

Silva, M.K. and F.M. Orr, Jr. "Effect of Oil Composition on Minimum Miscibility Pressure–Part 1: Solubility of Hydrocarbons in Dense $CO_2$", Nov. 1987, SPERE, pp. 466-468.

(List continued on next page.)

Primary Examiner—Jacqueline Haley
Attorney, Agent, or Firm—Davis and Bujold

[57] ABSTRACT

Linear olefin monomers, and particularly alpha-olefins, having a pour point greater than −102°, a flash point greater than 10° and a boiling point greater than 121° are proposed as frac fluids in treatment of oil and gas wells by fracturing. Linear olefin monomers are injected into the well, and fracturing pressures applied to the well to fracture the well. Linear olefin monomers may be mixed with a liquified drive fluid such as $CO_2$, preferably with the $CO_2$ forming a miscible bank ahead of the linear olefin monomers for use in driving the load fluid from the well.

10 Claims, 1 Drawing Sheet

OTHER PUBLICATIONS

Tudor, Robin, Chuck Vozniak, Mary Lou Banks and Wade Peters. "Technical Advances in Liquid $CO_2$ Fracturing", a paper (No. CIM 94–36) presented at the CIM Annual Technical Conference/Calgary, Jun. 12–15, 1994, pp. 2–5.

Warnock, Jr., W.E., P.C. Harris and D.S. King. "Successful Field Applications of $CO_2$–Foam Fracturing Fluids in the Arkansas–Louisiana–Texas Region", Jan. 1985, (no page #).

Ward, Victor L. and Dowell Schlumberger. "$N_2$ $CO_2$ in the Oil Field: Stimulation and Completion Applications", Jul. 1986, SPERE, p. 275.

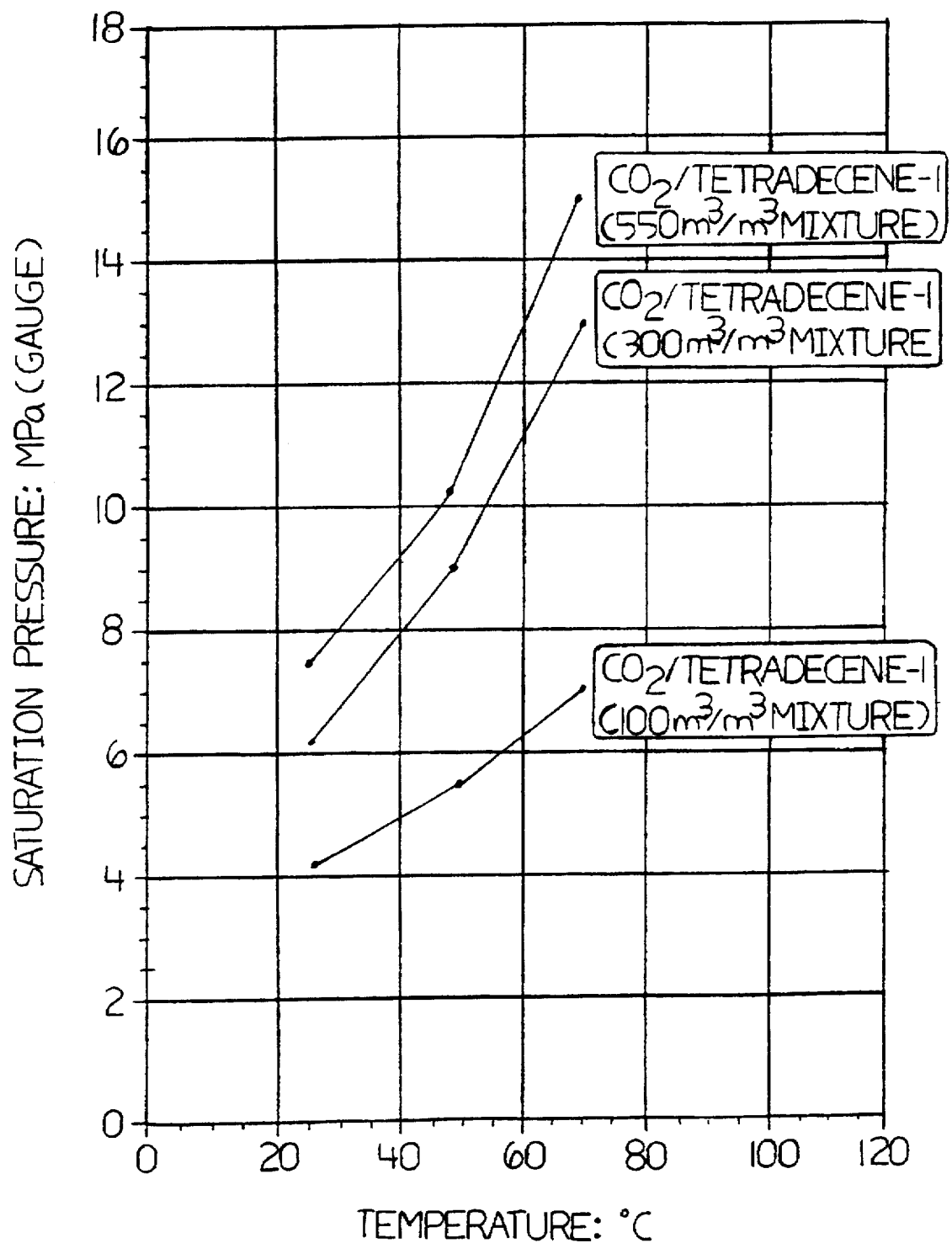

OLEFIN BASED FRAC FLUID

FIELD OF THE INVENTION

This invention relates to fluids used for frac fluids and a method of using the fluid as a frac fluid.

BACKGROUND OF THE INVENTION

In the oil industry, it is common to inject a fluid into a well penetrating a geologic formation and apply pressures to the fluid sufficient to cause fracturing of the formation. To treat a well like this is to frac a well.

Selection of an appropriate frac fluid is not an easy task. Various condensates, containing aromatics and alkanes, diesel, crude oil, nitrogen, water, and $CO_2$ have all been used with varying degrees of success. The difficulty in selecting a frac fluid is that the fluid must (1) be sufficiently viscous at reservoir temperatures and frac pressures that it can carry proppant (eg sand, for propping cracks open in the formation), yet not so viscous that it plugs the formation, (2) be relatively non-reactive with formation minerals such as clays, (3) be relatively non-toxic and (4) not precipitate asphaltenes. Each of the previously mentioned frac fluids has advantages and disadvantages.

In the frac business, there exists teaching that:

"Olefinic hydrocarbons are undesirable as injection solvents, not only because of asphaltene precipitation but also to due to their reactivity. Olefins may undergo dimerization, polymerization and hydration under reservoir conditions. Various clays catalyze these reactions." Hassen et al, "Improving Oilwell Stimulations with Compatible Oils", JCPT, 1986.

Olefins are a family of unsaturated chemically active hydrocarbons with one carbon-carbon double bond. Olefins, perhaps as a result of teachings like the Hassen article, have not been considered for use during fracturing of wells. The prior art seems to contain little teaching in the way of use of olefins in oil well applications at all. Olefins, including single alkenes, have been previously proposed for use as markers during drilling operations (Australian application AU-A-40138/93). Olefins have also been proposed as sulphur reactants for cleaning sulphur plugged oilwells (U.S. Pat. No. 3,835,927). Nonetheless, utility of olefins for fracturing wells appears unconsidered in the art.

SUMMARY OF THE INVENTION

The inventor has investigated and found, much to his surprise, that linear olefin monomers, and particularly alpha-olefins, having a pour point greater than $-102°$, a flash point greater than $10°$ and a boiling point greater than $121°$ have great utility as frac fluids. In one aspect of the method of the invention, the linear olefin monomers are injected into the well, and fracturing pressures applied to the well to fracture the well.

In a still advance in the art, it has been found that the linear olefin monomers may be mixed with a liquified drive fluid such as $CO_2$, preferably with the $CO_2$ forming a miscible bank ahead of the linear olefin monomers.

BRIEF DESCRIPTION OF THE DRAWINGS

FIG. 1 shows the $CO_2$ bubble point sensitivity for tetradecene.

DESCRIPTION OF THE PREFERRED EMBODIMENTS

The invention will now be described with reference to the figure which shows $CO_2$ bubble point sensitivity for tetradecene.

In this patent document, a load fluid is a fluid used to carry proppant in fracturing a well. A drive fluid is a fluid that is miscible with a load fluid and formation gas, and that can come out of solution in the load fluid when fracturing pressures are released from the load fluid.

The load fluid of the invention is a hydrocarbon fluid comprising linear olefin monomers having a pour point greater than $-102°$, a flash point greater than $10°$ and a boiling point greater than $121°$. Octene, decene, dodecene, tetradecene, hexadecene, octedecene and mixtures thereof are preferred. The properties of these olefins are shown in Table 1:

TABLE 1

| | Typical Properties | | | |
|---|---|---|---|---|
| | Specific Gravity $25°$ C./$26°$ C. | Pour Point °C. | Flash Point °C. (closed cup) | Boiling Range °C. |
| Octene-1 (C8) | 0.711 | −102 | 10 | 121–123 (5%–95%) |
| Decene-1 (C10) | 0.737 | −66 | 48 | 170–171 (5%–95%) |
| Dodecene-1 (C12) | 0.755 | −37 | 77 | 213–216 (5%–95%) |
| Tetradecene-1 (C14) | 0.768 | −18 | 107 | 245–260 (5%–95%) |
| Dodecene-1/ Tetradecene-1 blend (approx. 2/1 by weight) (C12–C14) | 0.780 | −35 | 81 | 216–260 (5%–95%) |
| Tetradecene-1/ Hexadecene-1 blend (approx. 6/3 by weight) (C14–C16) | 0.773 | −14 | 113 | 245–279 (5%–95%) |
| Hexadecene-1/ Octedecene-1 blend (C16–C18) | 0.782 | −2 | 135 | 285–316 (5%–95%) |

The proppant carrying ability of the olefins is illustrated in the Table 2, which shows that the olefins here described have sufficient viscosity to carry proppant. The table shows kinematic viscosities (which is ratio of viscosity in centipoise to the fluid's gravity in gm/cc) at −10 degrees celsius, +20, +40 and +100 degrees.

TABLE 2

| Fluid | −10 | +20 | +40 | +100 |
|---|---|---|---|---|
| C12 | 3.151 | 1.762 | 1.298 | <0.7 |
| C14 | 5.446 | 2,573– | 1.859– | <0.7 |
| C1214 | 3.741 | 1.923 | 1.437 | <0.7 |
| C1416 | 6.350 | 2.972 | 2.056 | <0.7 |
| C1618 | Solid | 4.605 | 3.016 | 1.271 |

Decene (10 carbon atoms) and the higher range of olefin monomers, particularly tetradecene, are preferred. The load fluid is preferably composed primarily of linear olefin monomers by volume, and a load fluid with at least 90% by volume is believed particularly useful. The load fluid may be mixed with other formation compatible hydrocarbon based load fluids containing aromatics, alkanes and naphthenes. Alpha-olefins (double bond on terminal carbon) are preferred. The load fluid may be mixed with liquid carbon dioxide.

In the method of the invention, a well penetrating a geologic formation is treated by first injecting into a well a hydrocarbon fluid including linear olefin monomers having a pour point greater than −102°, a flash point greater than 10° and a boiling point greater than 121°. Next, the well is treated by fracturing the formation by applying pressures to the hydrocarbon fluid sufficient to cause the formation to fracture. Pressure is then released from the load fluid which results in flow back of the load fluid out of the well.

A liquified drive fluid such as $CO_2$ may also be injected with the load fluid. Preferably, the liquified drive fluid is present in the load fluid in the early part of the frac, preferably before frac pressures are applied, in such amount that it forms a miscible bank of drive fluid ahead of the load fluid in the well. When the pressure is released from the load fluid during the frac, the miscible bank of drive fluid assists in recovering the load fluid in the well. The amount of drive fluid is preferably selected in reference to the figure, such that at a given formation pressure and temperature, when the frac pressure is removed from the load fluid, the state of the mixture of drive fluid and load fluid crosses from the single phase region above the lines shown in the figure to the two phase region below. When drive fluid comes out of solution in the two phase region, the fluid expands to help drive the load fluid from the well.

Tests have shown that these olefins have good miscibility with $CO_2$, and that the olefins had low reactivity with clays.

This project was broken into two (2) phases: The first phase utilized two (2) samples from the PCP Ferrybank 2-23-43-28 W4M well in Alberta, Canada. The samples were native state from preserved core. They were drilled using mineral oil as a bit lubricant. A sample was flushed with Tetradecene and aged at reservoir temperature (38° C.) for three days. Both samples were centrifuged to Sor, and wettability index by USBM was measured. The samples were Dean Starked to determine residual fluid saturations. The petrophysical properties were measured after the testing was completed. Note, the samples were not cleaned in methanol due to the rush nature of the testing. The wettability indices were very similar (mineral oil flush 0.181, tetradecene 0.117), representing a slightly water wet condition for the samples tested.

The second phase of testing utilized core samples from the PCP Bantry 10-9-19-13 W4M well in Alberta, Canada. These samples had been humidity dried to preserve clays. A sample was injected with Tetradecene and aged at reservoir temperature (42° C.) for three (3) days. A second sample was used as the control sample. Thin section and scanning electron microscopy analysis were performed to determine whether or not any detrimental effects on the clays were observed. Petrographic analysis showed that no obvious effects on the clays were observed.

A person skilled in the art could make immaterial modifications to the invention described and claimed in this patent without departing from the essence of the invention.

The embodiments of the invention in which an exclusive property or privilege is claimed are defined as follows:

1. A method of treating a well penetrating a geologic formation, comprising the step of:

injecting into a well a hydrocarbon fluid comprising linear olefin monomers having a pour point greater than −102°, a flash point greater than 10° and a boiling point greater than 121°;

treating the well by fracturing the formation by applying pressures to the hydrocarbon fluid sufficient to cause the formation to fracture; and subsequently flowing back the hydrocarbon fluid out of the well.

2. The method of claim 1 further including injecting a liquified drive fluid with the hydrocarbon fluid.

3. The method of claim 2 in which the liquified drive fluid forms a miscible bank ahead of the hydrocarbon fluid in the well.

4. The method of claim 2 in which the liquified drive fluid is carbon dioxide.

5. The method of claims 1 in which the linear olefin monomers have a pour point greater than −66°, a flash point greater than 46° and a boiling point greater than 170°.

6. The method of claim 5 in which the hydrocarbon fluid is comprised primarily of linear olefin monomers by volume.

7. The method of claim 1 which the linear olefin monomers have 10 or more carbon atoms.

8. The method of claim 5 in which the proportion of linear olefin monomers is at least 90% by volume.

9. The method of claim 1 in which the linear olefin monomers are alpha olefins.

10. The method of claim 1 in which the linear olefin monomers have primarily 12 or 14 carbon atoms.

* * * * *